United States Patent [19]
Matsuda et al.

[11] Patent Number: 4,548,036
[45] Date of Patent: Oct. 22, 1985

[54] HYDROSTATIC TRANSMISSION

[75] Inventors: Kazuo Matsuda, Kawasaki; Koichi Morita, Kamakura, both of Japan

[73] Assignee: Kabushiki Kaisha Komatsu Seisakusho, Tokyo, Japan

[21] Appl. No.: 443,112

[22] Filed: Nov. 19, 1982

[30] Foreign Application Priority Data

Nov. 19, 1981 [JP] Japan .................. 56-171377

[51] Int. Cl.⁴ .................. F16D 31/02
[52] U.S. Cl. .................. 60/464; 60/468
[58] Field of Search .................. 60/464, 468, 494, 403, 60/378; 91/451, 468, 461; 137/529

[56] References Cited

U.S. PATENT DOCUMENTS

| | | | |
|---|---|---|---|
| 3,522,704 | 8/1970 | Martin | 60/403 |
| 3,748,859 | 7/1973 | Pruvot | 60/464 |
| 3,983,701 | 10/1976 | Jennings et al. | 60/468 X |
| 4,282,898 | 8/1981 | Harmon et al. | 91/451 X |
| 4,327,549 | 5/1982 | Bianchetta et al. | 60/468 |
| 4,382,360 | 5/1983 | Dummer | 60/468 |

FOREIGN PATENT DOCUMENTS

| | | | |
|---|---|---|---|
| 56-80506 | 7/1981 | Japan | 91/451 |
| 798366 | 1/1981 | U.S.S.R. | 60/468 |

Primary Examiner—Edward K. Look
Attorney, Agent, or Firm—Armstrong, Nikaido, Marmelstein & Kubovcik

[57] ABSTRACT

A hydrostatic transmission for a vehicle having a closed loop hydraulic system hydraulically interconnecting a variable displacement hydraulic pump and a hydraulic motor. The closed loop hydraulic system includes first and second conduits forming the closed loop.

The first conduit is connected with a first relief valve having high and low setting pressure and the second conduit is connected with a second relief valve having high and low setting pressure. A hydraulic charge pump is connected with the closed loop hydraulic system through a charge conduit and a pilot-operated change over valve is disposed between the charge pump and the first and second relief valves in such a manner that when fluid pressure in the charge conduit exceeds a predetermined value fluid under pressure from the charge pump is introduced into the first and second relief valves to thereby change over the same to have high setting pressure and when the fluid pressure in the charge conduit becomes less than the predetermined value the first and second relief valves are connected with a tank to thereby change over the same to have low setting pressure.

1 Claim, 1 Drawing Figure

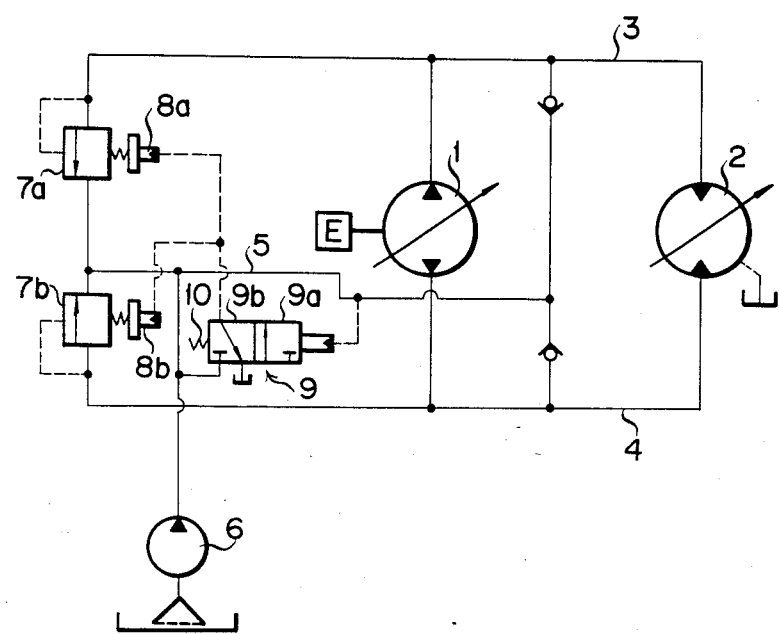

HYDROSTATIC TRANSMISSION

BACKGROUND OF THE INVENTION

This invention relates to a hydrostatic transmission wherein a hydraulic pump is connected with a hydraulic motor in a closed loop and the hydraulic motor is driven by the fluid under pressure delivered by the hydraulic pump to drive the vehicle.

If the amount of leakage of the fluid in the hydraulic circuits of the hydrostatic transmission increases so as to reduce the charge pressure exerted in the hydraulic circuits, then serious troubles such as failures of the hydraulic pump and the hydraulic motor may occur. There has been proposed no effective way to solve the problem.

SUMMARY OF THE INVENTION

It is therefore an object of the present invention to provide a hydrostatic transmission for a vehicle which can effectively overcome the above noted problem of the prior art.

Another object of the present invention is to provide a hydrostatic transmission for a vehicle wherein setting pressure of relief valves connected with a closed loop is changed to low setting pressure when a fluid pressure in a charge conduit is less than a predetermined value thereby reducing loads imposed on a hydraulic pump and a motor.

In accordance with an aspect of the present invention, there is provided a hydrostatic transmission for a vehicle having a closed loop hydraulic system hydraulically interconnecting a variable displacement hydraulic pump and a hydraulic motor, said closed loop hydraulic system including a first conduit and a second conduit, comprising: a charge pump for charging hydraulic fluid into said closed loop hydraulic system; charge conduit means interconnecting said charge pump and said closed loop hydraulic system; first relief valve means connected with said first conduit and having first means responsive to hydraulic fluid pressure in said charge conduit means to change over setting pressure of said first relief valve means between low and high setting pressures; second relief valve means connected with said second conduit and having second means responsive to the hydraulic fluid pressure in said charge conduit means to change over setting pressure of said second relief valve means between low and high setting pressures; and pilot-operated change over valve means disposed between said charge pump and said first and second relief valve means, said change over valve means having a connecting position and a disconnecting position and being operated by the hydraulic fluid pressure in said charge conduit means in such a manner that when the hydraulic fluid pressure in said charge conduit means exceeds a predetermined fluid pressure said change over valve means is changed over to and held at the connecting position thereby changing over said first and second relief valve means to have high setting pressure and when the hydraulic fluid pressure in said charge conduit means becomes less than the predetermined fluid pressure said change over valve means is changed over to and held at the disconnecting position thereby changing over said first and second relief valve means to have low setting pressure.

The above and other objects, features and advantages of the present invention will be readily apparent from the following description taken in conjunction with the accompanying drawing.

BRIEF DESCRIPTION OF THE DRAWING

The sole FIGURE is a schematic drawing depicting a hydrostatic transmission for a vehicle according to the present invention.

DESCRIPTION OF THE PREFERRED EMBODIMENT

The present invention will now be described below by way of example only with reference to the accompanying drawing.

In the drawing, there is schematically shown a hydraulic circuit of a hydrostatic transmission according to the present invention, with the component parts which are not directly concerned with the present invention such as shuttle valves interposed between the high pressure circuit and the low pressure circuit being omitted therein.

Reference numeral 1 denotes a variable displacement hydraulic pump, and 2 a variable displacement hydraulic motor, both of which are connected through a high pressure circuit comprised of a conduit 3 and a low pressure circuit comprised of a conduit 4 in a closed loop. The above-mentioned high pressure circuit and low pressure circuit are arranged to be reversed depending on the direction of rotation of the hydraulic motor 2.

Reference numeral 5 denotes a charge circuit, and 6 a charge pump. Reference numerals 7a and 7b indicate relief valves connected with the high pressure circuit 3 and the low pressure circuit 4, respectively. The setting pressures of the relief valves 7a and 7b can be changed over by means of setting pressure change over means 8a and 8b, respectively. Reference numeral 9 denotes a connection and disconnection change over valve interposed between the charge circuit 5 and the setting pressure change over means 8a, 8b of the relief valves 7a, 7b. The connection and disconnection change over valve 9 is arranged to be changed over by the pressure in the charge circuit 5 as a pilot pressure. The valve 9 is adapted to be held at a connecting position or communicating position 9a when the charge pressure becomes higher than a predetermined preset pressure, and switched over to a disconnecting position 9b by the force of a spring 10 when the charge pressure becomes lower than the preset pressure.

In the above-mentioned arrangement, in case the charge pressure becomes higher than a preset pressure, the connection and disconnection change over valve 9 will occupy its connecting position 9a so that the charge pressure may be exerted on the setting pressure change over means 8a and 8b of the relief valves 7a and 7b thereby keeping the setting pressures of the relief valves 7a and 7b under a high pressure condition. Accordingly, the hydraulic circuits 3 and 4 of the hyrostatic transmission will be maintained at a high setting pressure.

Whilst, when the charge pressure becomes less than the preset pressure, the connection and disconnection change over valve 9 will occupy its disconnecting position 9b so that the setting pressure of the relief valves 7a and 7b may be kept under a low pressure condition. As a result, the setting pressures in the hydraulic circuits 3 and 4 of the hydrostatic transmission will be reduced, and therefore the output of the hydraulic motor 2 will be reduced thereby reducing the loadings on the hydraulic pump 1 and the hydraulic motor 2.

Since the present invention is constructed as mentioned hereinabove, when the charge pressure in the hydraulic circuits becomes lower than a predetermined setting pressure, the setting relief pressure in the hydraulic circuits will be reduced so as to reduce the loadings on the hydraulic pump 1 and the hydraulic motor 2 thereby reducing the output of the hydraulic motor 2 so that the failure of the hydraulic pump 1 and the hydraulic motor 2 due to the reduction in the charge pressure can be prevented.

It is to be understood that the foregoing description is merely illustrative of a preferred embodiment of the invention, and that the scope of the invention is not to be limited thereto, but is to be determined by the scope of the appended claim.

What is claimed is:

1. In a hydrostatic transmission for a vehicle having a closed loop hydraulic system hydraulically interconnecting a variable displacement hydraulic pump and a hydraulic motor, said closed loop hydraulic system including a first conduit and a second conduit, the improvement comprising:

a charge pump for charging hydraulic fluid into said closed loop hydraulic system;

charge conduit means interconnecting said charge pump and said closed loop hydraulic system;

first relief valve means connected with said first conduit and having first means responsive to hydraulic fluid pressure in said charge conduit means to change over of said first relief valve means between low and high setting pressures;

second relief valve means connected with said second conduit and having second means responsive to the hydraulic fluid pressure in said charge conduit means to change over setting pressure of said second relief valve means between low and high setting pressures; and pilot-operated change over valve means disposed between said charge pump and said first and second relief valve means, said change over valve means having a connecting position directly connecting said charge pump to said first and second means and a disconnecting position directly connecting said first and second means to a drain and being operated by the hydraulic fluid pressure in said charge conduit means in such a manner that when the hydraulic fluid pressure in said charge conduit means exceeds a predetermined fluid pressure said change over valve means is changed over to and held at the connecting position thereby changing over said first and second relief valve means to have high setting pressure and when the hydraulic fluid pressure in said charge conduit means becomes less than the predetermined fluid pressure said change over valve means is changed over to and held at the disconnecting position thereof changing over said first and second relief valve means to have low setting pressure.

* * * * *